J. T. JONES.
Sewing-Machine.
No. 197,141.  Patented Nov. 13, 1877.
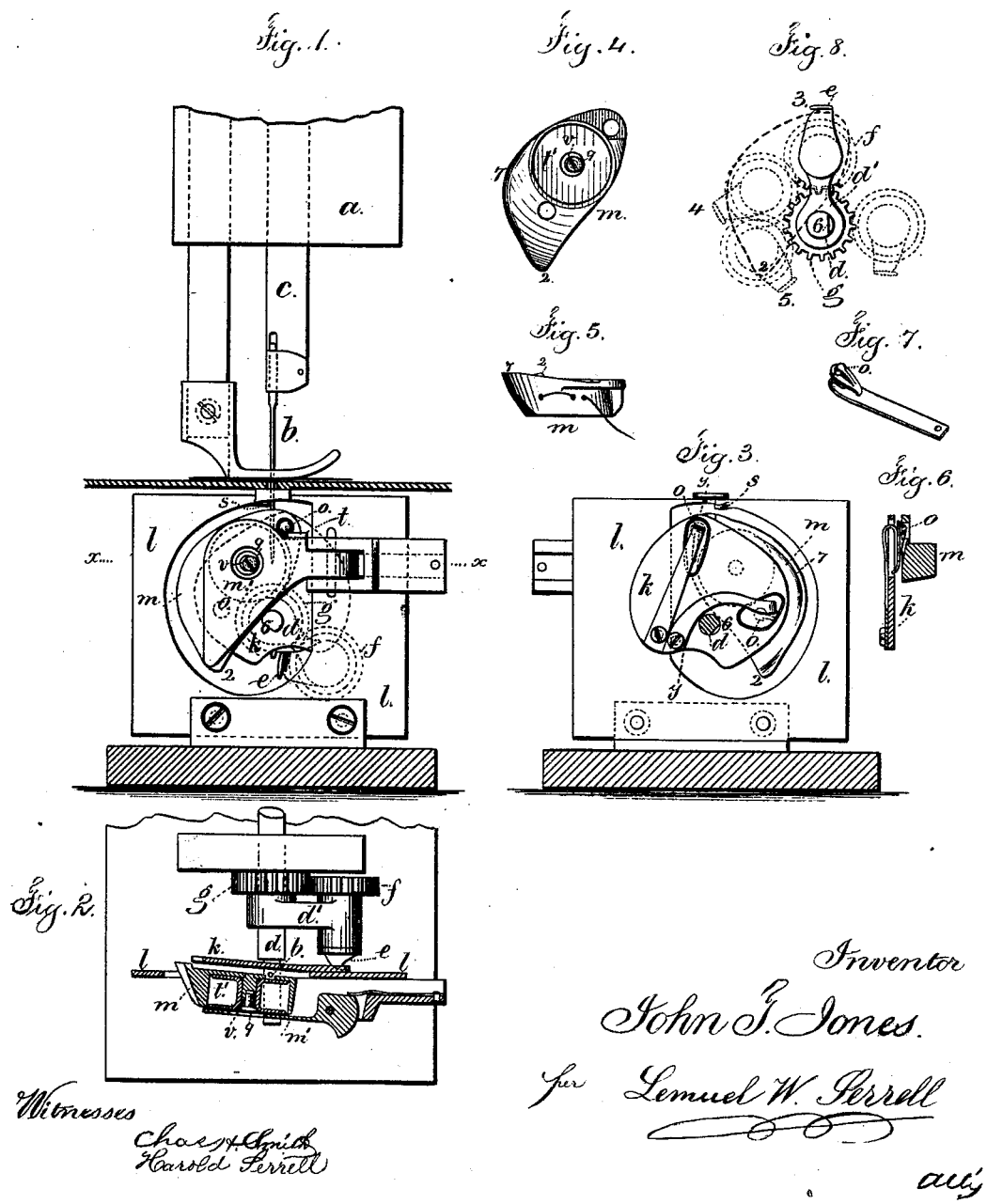

UNITED STATES PATENT OFFICE.

JOHN T. JONES, OF ILION, NEW YORK.

IMPROVEMENT IN SEWING-MACHINES.

Specification forming part of Letters Patent No. 197,141, dated November 13, 1877; application filed April 20, 1877.

*To all whom it may concern:*

Be it known that I, JOHN T. JONES, of Ilion, in the county of Herkimer and State of New York, have invented an Improvement in Sewing-Machines, of which the following is a specification:

The loop of needle-thread is taken by a hook that is moved in an epicycloidal line, and carries the thread around the point of the shuttle, and then moves out of the loop near the center of the actuating-shaft, leaving it to be drawn up around the shuttle. The shuttle is at the opposite side of the needle to the loop and its hook; hence there is a free space for the hook to revolve in, and the loop is spread by the hook and carried around the shuttle, and then cast off. The shuttle is held toward a stationary plate by a spring, and there are yielding pins with inclined leaders to hold the shuttle in position, but allow the thread to draw up freely and pass these leaders and pins.

In the drawings, Figure 1 is an elevation of the shuttle, its holder, and the front plate of the sewing-machine. Fig. 2 is a plan of the hook and section of the shuttle and holder at the line $x\,x$. Fig. 3 shows the back of the shuttle-holder. Fig. 4 is an elevation of the shuttle separately, and Fig. 5 is a plan of the same. Fig. 6 is a section of the shuttle and holder at about the line $y\,y$. Fig. 7 is a perspective view of the yielding leader-pin, and Fig. 8, a diagram illustrating the movement of the hook that carries the loop of needle-thread around the shuttle.

The front plate $a$ of the sewing-machine, the reciprocating eye-pointed needle $b$, the needle-bar $c$, and pressure-foot are introduced to illustrate the connection of the same with the parts to which my invention relates. The shaft $d$ is revolved in harmony with the movements of the needle, and it carries a crank-arm, $d'$, with a shaft through its moving end, at one end of which arm is the loop-spreading hook, $e$, and at the other end is the gear-wheel $f$, the teeth of which gear into the stationary wheel $g$ that surrounds the shaft $d$, but is firmly fastened to the frame of the machine; hence the hook $e$ makes one complete revolution with its shaft in the crank-arm $d'$, and it is also carried bodily around the shaft $d$; hence the hook travels in an epicycloidal line, and takes the loop farthest from the center, and casts it off just before the hook reaches the point that is nearest the center.

The shuttle is pointed and shaped as will be more fully described hereinafter; but its point or nose stands downwardly, and in a plane that is slightly inclined inwardly to the plane in which the notch of the loop-spreading hook $e$ revolves, so that one part of the loop of needle-thread is carried outside of and down below the point 2 of the shuttle, and the other part of the loop of thread is at the inner side of the shuttle; and as the hook $e$ is carried toward the center of $d$ by the epicycloidal movement, its revolution causes the V-shaped notch of the hook to move up toward the shaft $d$, and thereby deliver the loop of needle-thread, and allow it to be drawn up toward and around the shuttle.

The diagram, Fig. 8, illustrates the path described by the loop-spreading hook, and the direction in which the hook stands to that path at different points, the loop of thread being taken in the position 3, spread at 4, and delivered at 5.

The shuttle is sustained near a plate, $k$, that is attached to or formed with the frame $l$. There is an opening through between $k$ and $l$ that allows of the passage of the loop around the shuttle as it lies against the plate $l$, and this plate $l$ is in the shape of an epicycloid, so that the hook $e$ revolves around and adjacent thereto.

The shuttle $m$ is held between the plate $k$ and a swinging plate, $m'$, which latter has a spring and square knuckled to retain it in position, there being the necessary space or looseness at both sides of the shuttle for the thread to draw up, and the needle passes in between the shuttle $m$ and the plate $k$ into a channel in one or both surfaces, and the shuttle is made with holes, into which enter the yielding pins $o$ with round heads; but as the thread has to be drawn between the shuttle and these yielding pins, I make use of an inclined leader projecting from the side of the pin $o$ in the direction from which the thread approaches the pin. The shuttle is provided with slots and holes of corresponding shape to the supporting-pins and their leaders, and the pins and leaders are upon springs that yield freely as the thread is drawn past, and spring back to place.

As an additional means for supporting the shuttle, I prolong the shaft $d$ beneath the same; and one side of this shaft is filed off, as at 6, so that a space will be left between the shuttle and the shaft at the time the loop of needle-thread is being drawn past that place.

The edge of the shuttle extends backwardly, with a lip, as at 7, and from this lip the bevel of the nose of the shuttle extends forward; and there is upon the plate $b$ a separator-point, $s$, standing toward the needle. Hence as the needle rises and forms a loop at the side of the needle away from the shuttle, the loop-spreader takes that loop, carries it away, and spreads the same, carrying the part of the loop that extends from the eye of the needle to the hook between the shuttle and the plate $k$, and the other part of the loop that extends from the under side of the cloth to the hook is directed by the revolving loop-spreading hook in front of the lip 7 of the shuttle, so that it draws between the shuttle and the yielding holding-plate $m'$. The part of the loop extending from the cloth downwardly draws into the separator-fork $s$, so that its position will not be varied by the movement of the cloth in feeding the same.

By this construction of shuttle and revolving hook the loop is taken at one side of the needle and thrown around the shuttle, which is at the other side of the needle, and the loop-spreading hook in its revolution carries the loop around the shuttle, and also continues to move and turns out of the loop, so as to leave it in the correct position to draw up as the needle rises.

The epicycloidal movement aforesaid is very rapid in taking and carrying the loop around the shuttle; but the movement is slow when the loop is being drawn up from the hook.

In order to aid in holding the shuttle in position a lip, $t$, may be made use of upon the swinging shuttle-holder $m'$, the same passing above a shoulder at the back of the shuttle. When the shuttle-holder $m'$ is swung back the shuttle can be removed for changing the bobbin.

The bobbin $t'$ is of usual character, and it is in the shape of a flat spool passing into a cylindrical cavity in the shuttle, and this revolves upon a central stud, $v$. At the outer end of this stud $v$ there is a screw, 9, that is placed eccentric to the stud; and the head of the screw is eccentric, and the center of the bobbin is recessed, so that when the screw is turned down firmly the bobbin will be held by the eccentric portion projecting over the inner edge of the bobbin, and when the screw is turned back so that its ecentric head coincides with the stud the bobbin can be taken out of the shuttle.

I claim as my invention—

1. The combination, with the shuttle and needle in a sewing-machine, of the loop-spreading hook and mechanism, substantially as described, whereby the hook is rotated and the point caused to travel in an epicycloidal line to carry the loop around the nose of the shuttle and deliver it near the center, as set forth.

2. The yielding leader-pins made with round heads and inclined projections at one side, in combination with the shuttle having corresponding slotted holes, substantially as set forth.

3. The shuttle $m$, sustained by yielding pins against a fixed plate, in combination with the yielding holding-plate $m'$ and loop-spreading hook, and mechanism for moving such hook in an epicycloidal line, substantially as set forth.

4. The combination, with the shuttle-body and bobbin, of the holding-stud and eccentric screw with an eccentric head, substantially as and for the purposes set forth.

5. The combination, with the shuttle $m$ and its yielding pins $o$ and spring-holder $m'$, of the supporting-shafts $d$ with one side removed, substantially as specified.

Signed by me this 5th day of April, A. D. 1877.

JOHN T. JONES.

Witnesses:
GEO. S. KNIGHT,
LOUIS E. MOORE.